A. E. SMITH.
MOVING PICTURE MACHINE.
APPLICATION FILED OCT. 11, 1909.

971,155.

Patented Sept. 27, 1910.
2 SHEETS—SHEET 1.

WITNESSES:

INVENTOR
Albert E. Smith
BY
ATTORNEYS

A. E. SMITH.
MOVING PICTURE MACHINE.
APPLICATION FILED OCT. 11, 1909.

971,155.

Patented Sept. 27, 1910.
2 SHEETS—SHEET 2.

UNITED STATES PATENT OFFICE.

ALBERT E. SMITH, OF NEW YORK, N. Y., ASSIGNOR TO THE VITAGRAPH COMPANY OF AMERICA, OF NEW YORK, N. Y., A CORPORATION OF NEW YORK.

MOVING-PICTURE MACHINE.

971,155.  Specification of Letters Patent.  Patented Sept. 27, 1910.

Application filed October 11, 1909.  Serial No. 521,975.

*To all whom it may concern:*

Be it known that I, ALBERT E. SMITH, a citizen of the United States, residing in the borough of Brooklyn, city and State of New York, have invented certain new and useful Improvements in Moving-Picture Machines, of which the following is a specification.

This invention relates to moving-picture machines, and has reference particularly to the means for guiding the tape-film on which the pictures are arranged in single-line sequence.

The invention concerns especially the guiding of the film in its movement over and adjacent to the opening through which the beam of light is projected. Heretofore it has been common to provide stationary devices adjacent to the opening for the beam of light, adapted to receive the edges of the tape-film and guide the latter in its movement, but I have found that the use of such stationary guiding devices is open to serious objection, for the reason that it frequently happens that such devices scratch the film, in some cases so badly as to render the film unsuitable for further use. This is true particularly of the guiding devices coacting with the side of the tape-film carrying the emulsion in which the pictures are formed and which must be entirely free from scratches in order that a good reproduction of the pictures may be secured.

In accordance with my invention, I have provided movable guiding devices for the film in its passage over and adjacent to the opening for the beam of light, these devices being arranged to be moved either by the driving mechanism on the machine or solely by their coaction with the moving film. Preferably the movable guiding devices are pressed against the film with a yielding pressure, which may be adjusted as required, as in this way the guiding devices will efficiently perform their function and at the same time will recede slightly if necessary, in order to allow the free passage of the film.

I have illustrated the preferred embodiment of my invention in the accompanying drawings, in which—

Figure 1:
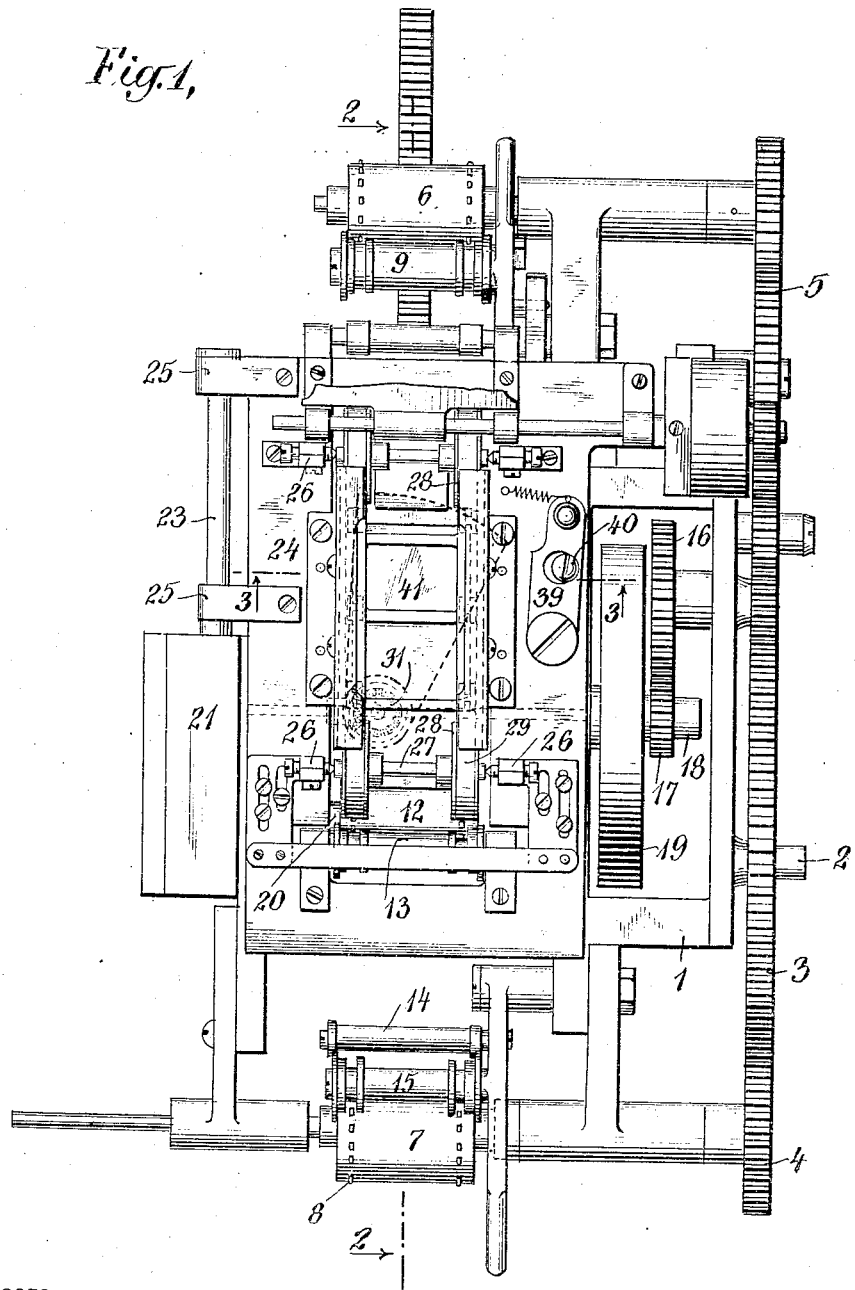
Figure 2:
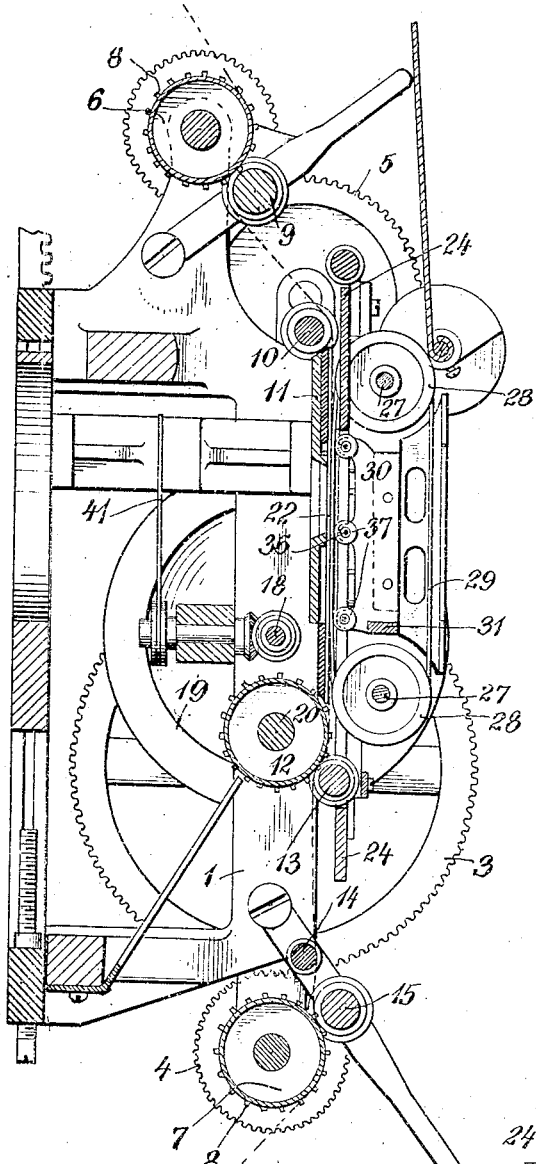
Figure 3:
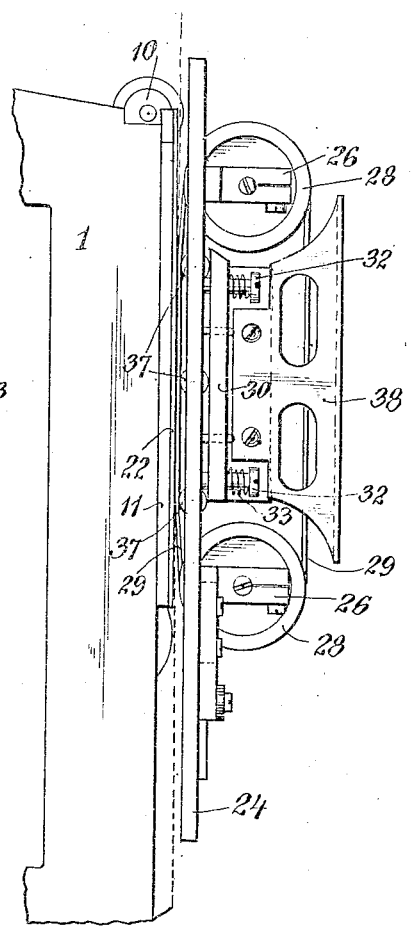
Figure 5:
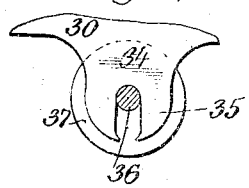
Figure 4:
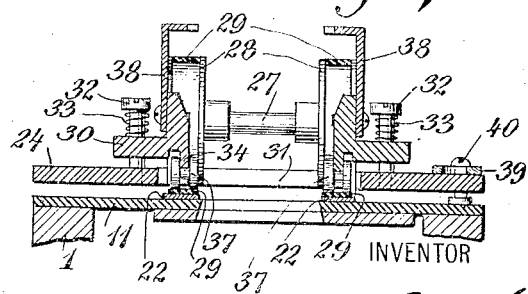

Figure 1 is a front view of the moving-picture machine; Fig. 2 is a vertical section on line 2—2 of Fig. 1; Fig. 3 is an elevation of a portion of the machine; Fig. 4 is a transverse section on line 3—3 of Fig. 2; and Fig. 5 is an enlarged detail view illustrating one of the guiding rollers.

Referring to these drawings, 1 indicates a frame on which is mounted a stub-shaft 2 carrying a gear 3, this gear meshing with a pinion 4 and with a train of gears 5, by which rotary motion is communicated to rollers 6 and 7, each having two lines of teeth 8 formed thereon. The tape-film is provided with openings to receive the teeth 8 in the usual manner. The roller 6 is rotated to draw the tape from the reel on which it is wound, and from the roller 7 the tape passes to a similar reel upon which it is wound after having had the pictures thereon reproduced by the machine. From the roller 6 the tape passes around a roller 9 held against the roller 6 by spring-pressure, and then around a roller 10 which is loosely mounted upon a suitable shaft in position to guide the film vertically downward over a frame 11. At the lower end of the frame 11 is mounted a roller 12, between which and a loosely mounted roller 13 the tape-film passes. From these rollers the film passes between guiding rollers 14 and 15 to the roller 7. On the shaft of one of the gears of the train 5, is a gear 16 meshing with a pinion 17 mounted on a shaft 18, and this shaft carries a fly-wheel 19. The shaft 18 is connected to the shaft 20 of the roller 12 by means of an intermittent gear, preferably of the Geneva type, which is inclosed within a casing 21. By means of this gearing, the film is actuated, step by step, a distance equal to the length of one picture on the film in each step. A suitable shutter 41 is arranged to cut off the light during the interval when the tape is being moved. The construction above briefly set forth is one which has been in very common use in moving-picture machines, and a more detailed description thereof is, therefore, considered unnecessary.

The frame-plate 11 above referred to is shown in cross-section in Fig. 4, this plate having a rectangular opening therein, through which the beam of light is projected. To the outer face of the plate 11 are secured two sheet-metal strips 22, parallel to each other, and one on either side of the opening in plate 11. The tape-film in moving from the roller 10 to the roller 12 passes vertically downward over one face of the plate 11, its edges overlying the strips 22. Secured to the frame of the machine, is a shaft 23, upon which a plate 24 is pivotally mounted by means of hinges 25. On this plate are erected two pairs of standards 26, each of which forms a pivotal support for a shaft 27 carrying two rollers 28. The rollers 28 support two belts 29 of rubber or thin leather, each of which runs on one of the rollers on each of the shafts 27. The belts 29 are in alinement with the strips 22, so that while on one side of the rollers the belts lie closely adjacent to the strips 22, as shown in Fig. 4.

The edges of the film pass between the belts 29 and the strips 22, and the film is held in proper relation to the parts of the machine by these devices. Between the two shafts 27, means are provided for exerting a yielding pressure upon the belts 29 to press them into engagement with the film. For this purpose, a frame is provided, consisting of side-members 30 connected by a cross-piece 31, and flanges projecting outwardly from the side-members 30 are provided with openings to receive screws 32, the ends of which enter threaded openings in the plate 24. Springs 33 are coiled about the screws 32, their ends engaging the heads of the screws and the flanges on the side-members 30, so that these springs exert a yielding pressure upon the frame to press it toward the plate 11, and by turning the screws 32 in one direction or the other the pressure exerted by the springs 33 may be adjusted as desired. The side-members 30 are also provided with flanges 34 lying at right angles to the flanges through which the screws 32 pass, and the flanges 34 are each provided with a plurality (preferably three) of projections 35 (Fig. 5), in each of which is an elongated slot, and each of these slots receives the shaft 36 of a small roller 37. It will be seen, especially from Fig. 4, that the rollers 37 are in position to coact with the portions of the belts 29 which directly overlie the strips 22, so that the springs 32 will cause the rollers 37 to be pressed yieldingly in a direction to press upon these portions of the belts 29 and cause the latter to hold the edges of the film securely between them and the strips 22.

If desired, sheet-metal pieces 38 may be secured to the side-members 30, these pieces being of angular cross-section and arranged to overlie the upper portions of the belts 29 to serve as guards therefor. A spring-catch 39 is pivotally mounted upon the plate 24, in position to coact with a stud 40 upon the frame 1 of the machine to hold the plate 24 in the closed position in which it is shown in the drawings.

The operation of the picture machine constructed as above described is the same as that of the machines of this type heretofore employed.

It will be seen that as the tape-film moves across and adjacent to the opening through which the beam of light is projected, it is securely held in its proper relation to the light-opening by the belts 29 and the strips 22, between which the edges of the film are received; but the guiding device which coacts with the side of the film upon which is the emulsion is a movable guiding device, so that while the film is properly and reliably guided in its movement, there is no danger of scratching the emulsion and thus damaging the film. This movable guiding device is actuated solely by the film itself, and it is held in coaction with the edges of the film yieldingly by a spring-pressure which may be readily adjusted as desired.

The mounting of the movable guiding device upon a pivoted plate which may be readily turned to expose the film and the underlying parts permits of ready access to all parts of the machine for inspection and repair.

Having now described my invention, what I claim as new therein and desire to secure by Letters Patent is as follows:—

1. In a moving-picture machine, the combination of a member having an opening therein through which the beam of light is projected, means for moving a film intermittently, rollers for guiding the film over said opening when so moved, a shutter for obstructing the light when the film is moved, and a movable guiding device for the film independent of said film-moving means and movable with the film in the direction of the length thereof and in coaction with the edges of the film to guide the latter over said opening, substantially as set forth.

2. In a moving-picture machine, the combination of a member having an opening therein through which the beam of light is projected, means for moving a film intermittently, rollers for guiding the film over said opening when so moved, a shutter for obstructing the light when the film is moved, shafts mounted on opposite sides of said opening, two rollers on each of said shafts, and belts running on corresponding rollers on said shafts and coacting with the edges of said film to guide the latter in its movement over said opening, said belts being independent of and additional to said means for moving the film intermittently, substantially as set forth.

3. In a moving-picture machine, the combination of a member having an opening therein through which the beam of light is projected, rollers for guiding the film over said opening, shafts mounted on opposite sides of said opening, two rollers on each of said shafts, belts running on corresponding rollers on said shafts and coacting with the edges of said film to guide the latter in its movement over said opening, means independent of said belts for moving the film intermittently, a shutter for obstructing the light when the film is moved, and a single means for operating the shutter and said film-moving means, said belts being moved solely by their coaction with the film when the latter is moved, substantially as set forth.

4. In a moving-picture machine, the combination of a plate having an opening therein through which the beam of light is projected, metallic strips on said plate parallel to each other and on opposite sides of said opening, means for moving a film intermittently, rollers for guiding the film over said opening when so moved, a shutter for obstructing the light when the film is moved, two shafts, rollers thereon, and belts running on corresponding rollers on said shafts in alinement with said strips and holding the edges of the film between them and the strips, substantially as set forth.

5. In a moving-picture machine, the combination of a member having an opening therein through which the beam of light is projected, means for moving a film intermittently, rollers for guiding the film over said opening when so moved, a shutter for obstructing the light when the film is moved, movable belts coacting with the edges of said film and guiding the latter in its movement over said opening, and means for exerting a yielding pressure on said belts to press them against said film, substantially as set forth.

6. In a moving-picture machine, the combination of a member having an opening therein through which the beam of light is projected, means for moving a film intermittently, rollers for guiding the film over said opening when so moved, a shutter for obstructing the light when the film is moved, movable belts coacting with the edges of said film and guiding the latter in its movement, and rollers bearing on said belts, substantially as set forth.

7. In a moving-picture machine, the combination of a member having an opening therein through which the beam of light is projected, means for moving a film intermittently, rollers for guiding the film over said opening when so moved, a shutter for obstructing the light when the film is moved, movable belts coacting with the edges of said film and guiding the latter in its movement over said opening, rollers coacting with the portions of said belts which engage the film, and means for exerting spring pressure on said rollers, substantially as set forth.

8. In a moving-picture machine, the combination of a member having an opening therein through which the beam of light is projected, means for moving a film intermittently, rollers for guiding the film over said opening when so moved, a shutter for obstructing the light when the film is moved, a pair of shafts on opposite sides of said opening, wheels on said shafts, belts running on corresponding wheels on said shafts and coacting with said film to guide the latter, a frame, rollers mounted on said frame and coacting with said belts, and springs acting on said frame, substantially as set forth.

9. In a moving-picture machine, the combination of a plate having an opening therein through which the beam of light is projected, metallic strips secured to said plate parallel to each other on opposite sides of said opening, means for moving a film intermittently, rollers for guiding the film over said opening when so moved, a shutter for obstructing the light when the film is moved, two shafts, rollers thereon, belts running on corresponding rollers on said shafts in alinement with said strips and holding the edges of the film between them and the strips, a frame, rollers mounted on said frame and coacting with said belts, and springs acting on said frame, substantially as set forth.

This specification signed and witnessed this 30th day of September, 1909.

ALBERT E. SMITH.

Witnesses:
J. STUART BLACKTON,
W. J. WATKINS.